United States Patent Office 3,749,704
Patented July 31, 1973

3,749,704
N-(ω-AMINO LOWER ALKYL)-AMIDES OF
1,17-MODIFIED ACTH PEPTIDES
Rolf Geiger, Frankfurt am Main, and Hans-Georg Schröder, Hofheim, Taunus, Germany, assignors to Farbwerke Hoechst Aktiengesellschaft vormals Meister Lucius & Brüning, Frankfurt am Main, Germany
No Drawing. Filed Oct. 29, 1970, Ser. No. 85,216
Claims priority, application Germany, Oct. 31, 1969,
P 19 54 794.5
Int. Cl. C07c *103/52;* C07g *7/00;* C08h *1/00*
U.S. Cl. 260—112.5      1 Claim

ABSTRACT OF THE DISCLOSURE

Biologically-active ACTH peptide amides modified in the 1-position by β-alanyl, γ-aminobutyryl, D-seryl, β-hydroxypropionyl, or n-alkoxycarbonyl, and in the 17-position by lysine or ornithine, the amide group thereof further having an N-(ω-amino lower alkyl) substituent.

---

The present invention relates to peptides of the general Formula I

X-Tyr-Ser-Met-Glu-His-Phe-Arg-Trp-Gly-Lys-
    Pro-Val-Gly-Lys-Lys-Y-NH-$(CH_2)_n$-$NH_2$   (I)

in which X represents β-alanyl, γ-aminobutyryl, D-seryl, β-hydroxypropionyl or n-alkoxycarbonyl, the alkyl radical of which contains from 1 to 4 carbon atoms, Y represents lysine or ornithine and $n$ stands for an integer of from 2 to 6.

The present invention further relates to a process for the preparation of compounds of the Formula I, which comprises condensing a peptide of the general Formula II A-Tyr-Ser-Met-Gly(OBu$^t$)-His-Phe-Arg-Trp-Gly-OH   (II)

in which A represents Boc-β-alanyl, Boc-γ-aminobutyryl, Boc-D-seryl, β-hydroxypropionyl or n-alkoxycarbonyl, the alkyl radical of which contains from 1 to 4 carbon atoms, and Bu$^t$ stands for tertiary butyl, with peptides of the general Formula III.

H-Lys(Boc)-Pro-Val-Gly-Lys(Boc)-Lys(Boc)-
    Y(Boc)-NH-$(CH_2)_n$-NH-Boc   (III)

in which Boc represents tertiary butyloxycarbonyl and Y and $n$ are as defined above, with dicyclohexyl-carbodiimide in the presence of activating components the pK value of which is between 4 and 8, for example 4-nitrophenol, 2,4,5-trichlorophenol, pentachlorophenol, thiophenol, 4-chlorothiophenol, thiophenol, 4-chlorothiophenol, 4-nitrothiophenol, N-hydroxysuccinimide, N-hydroxyphthalimide, saccharin, N - hydroxybenzotriazole or 3-hydroxy-4-oxo-3,4-dihydro - 1,2,3 - benzotriazine, and subsequently splitting off the protective groups by means of strong acids, for example trifluoro-acetic acid or hydrochloric acid.

The nonapeptide

H-Tyr-Ser-Met-Glu(OBu$^t$)-His-Phe-Arg-Trp-Gly-OH used as starting product for the preparation of the peptide of Formula II as well as the hexapeptide Z-Lys(Boc)-Pro-Val-Gly-Lys(Boc)-Lys(Boc)-OH used for the preparation of the peptides of Formula III are well known.

The condensation of both the peptide fragments is carried out as follows: the compound of Formula II, together with the compound of Formula III is dissolved in a solvent such as dimethylformamide, dimethylacetamide, phosphoric acid-trisdimethylamide, tetramethyl urea, n-methyl-pyrrolidone, pyridine, or a mixture of these solvents; at least 1 equivalent, preferably from 2 to 4 equivalents, of a compound forming active esters is added, and finally a carbodiimide, preferably dicyclohexyl-carbodiimide, is introduced as condensation agent in a 2–5 molar amount. As compounds for the formation of active esters, hydroxy, mercapto, or imine compounds having a pK value of from 4.0 to 8.0 may be used. Above all, the standard compounds of peptide chemistry, for example 4-nitrophenol, 2,4,5-trichlorophenol, pentachlorophenol, pentafluorophenol, N - hydroxysuccinimide, N-hydroxyphthalimide, thiophenol, 4-chlorothiophenol, 4-nitrothiophenol or saccharin, further 1-hydroxybenzotriazole, 1-hydroxybenzotriazoles substituted at their nucleus, or 3-hydroxy-4-oxo-3,4-dihydro-1,2,3-benzotriazine are used. The peptides of Formula III have to be present in this condensation in the form of salts of a strong acid, for example as benzene-sulfonates, toluene-sulfonates or chlorides.

Depending on the compound added, stirring is continued at room temperature for 3 hours up to 5 days. It is also possible to work at a somewhat lower temperature, for example at 0°, or at a moderately elevated temperature, up to about 60°, the reaction time being correspondingly extended or reduced.

After the condensation is complete, the condensation product is optionally filtered to remove the precipitated urea, for example dicyclohexyl urea, and the crude reaction products are precipitated by adding a solvent in which the peptides are practically insoluble, for example ether or ethyl acetate. In order to split off the protective groups, the condensation products then are dissolved for about 1 hour in trifluoro-acetic acid advantageously containing some water and thioglycolic acid and which may also contain hydrochloric acid. After the reaction is complete, the peptides of the general Formula I, freed from protective groups, are precipitated by adding ether. A further purification can be obtained in known manner, for example by chromatography on carboxymethyl cellulose.

The peptides of the invention are amides of heptadecapeptides or $N^α$-acyl-hexadecapeptides substituted by a base, which have a surprisingly high adrenocorticotropic activity.

It is known that peptides which are reduced to the 1–19 sequence of natural ACTH still have their full biological effect in case they are present as amides, i.e. if they are protected against decomposition by carboxypeptidases. However, the biological effect rapidly decreases in case of further reduction.

It has been further described that a replacement of the first amino acid, the L-serine by other radicals, for example D-serine, D-alanine, D-threonine, β-alanine, γ-aminobutyric acid or β-hydroxypropionic acid, leads to an increased biological effect, which can be 5–10 times the effect of the unchanged peptide having L-serine in the 1 position. It is further known that the 17- and 18-positions in ACTH can be replaced by lysine or ornithine without reducing the effect. The following table illustrates this process:

TABLE I

| Compound No. | Sequence of ACTH as amide | Sayers test sc. I.U./mg. | Steroid secretion i. vivo I.U./mg. |
|---|---|---|---|
| (1) | 1–19 | 121 | 150 |
| (2) | 1–18 | | 136 |
| (3) | 1–17 | 33 | 35 |
| (4) | 1–16 | 1.4 | |
| (5) | 1–15 | 0.2 | |
| (6) | 1–13 | 0.1 | |

As the table shows, a heptadecapeptide, the sequence of which is unchanged, has a diminished ACTH activity of only 1/3, the hexadecapeptide of only 1%.

It is all the more surprising that the peptides of the invention having no more than only 17 or 16 amino acids show a prolonged biological activity which, in the Sayers test, exceeds by far the activity of natural ACTH, as is evident from the following Table II.

TABLE II

| | I.U./mg., Sayers, test, sc., 3rd internat. standard |
|---|---|
| (7) [βAla¹-Lys¹⁷] Corticotropin-(1-17)-heptadecapeptide-4-amino-n-butylamide. | ~800 |
| (8) [D-Ser¹-Lys¹⁷] Corticotropin-(1-17)-heptadecapeptide-4-amino-n-butylamide. | 400-600 |
| (9) Nα(β-hydroxypropionyl)-[Lys¹⁷] Corticotropin-(2-17)-hexadecapeptide-4-amino-n-butylamide. | 350-500 |
| (10)¹ [βAla¹-Lys¹⁷] Corticotropin-(1-17)-heptadecapeptide-amide. | 150-250 |

¹ In comparison.

This table shows that an amide (10) unsubstituted by a base shows an increase in activity after replacing Ser¹ by β-alanin, but does not attain the activity of the peptides of the invention. More conspicuous still is the difference between the hexadecapeptide (9) and the hexadecapeptide (4); the activity of the first being 100 to 200 times that of the latter.

Since lengthening a peptide by only a single amino acid means a considerable amount of work and material, the elimination of an amino acid represents a considerable technical advance in the preparation of such compounds. For example, the linking of H-Lys(Boc)-NH$_2$ to a peptide requires 6 reaction steps just for the preparation of this compound. The mono-tert.-butyloxycarbonyl-diamines used in the process of the invention however can be easily prepared in two steps and give high yields.

These new compounds have the activity spectrum of the natural ACTH and may be used in therapy in the same manner as the latter. However, because of their considerable increased activity, only a very small amount of the compounds of the general Formula I is required in comparison with the amount of natural hormone necessary in this case.

The following examples illustrate the invention:
Abbreviations:
Etoc—ethyl-oxycarbonyl
TCP—2,4,5-trichlorophenyl
Np—4-nitrophenyl
γAbu—γ-aminobutyric acid

EXAMPLE 1

βAla-Tyr-Ser-Met-Glu-His-Phe-Arg-Trp-Gly-Lys-Pro-Val-Gly-Lys-Lys-Lys-NH-(CH$_2$)$_4$-NH$_2$-acetate, aq.

(a) Z-Lys(Boc)-NH-(CH$_2$)$_4$ - NH - Boc.—7.0 g. (31 mmols) of Boc-NH-(CH$_2$)$_4$-NH$_2$·HCl and 4.2 ml. (30 mmols) of triethylamine in 100 ml. of dimethylformamide are stirred for 20 hours together with 16.8 g. (30 mmols) of Z-Lys(Boc) OTCP. The product is filtered off the triethylammonium chloride and the filtrate is evaporated to dryness in vacuo. The residue is dissolved in ethyl acetate, thoroughly shaken at 0° with 2 N citric acid, 1 N bicarbonate and H$_2$O and dried over sodium sulfate. After distilling off the solvents, the residue is recrystallized two times from isopropanol/ether. Yield: 14.1 g. (83%), M.P. 83–85° C.

C$_{28}$H$_{46}$N$_4$O$_7$·H$_2$O (568.7)—Calcd. (percent): C, 59.12; H, 8.52; N, 9.86. Found (percent): C, 59.2; H, 8.6; N, 9.6.

(b) H-Lys(Boc)-NH-(CH$_2$)$_4$-NH - Boc-tosylate.—11.4 g. of the Z-compound prepared according to (a) are hydrogenated in 80 ml. of methanol, while adding methanolic toluene-sulfonic acid at pH 5. After the reaction is complete, the product is filtered to remove the catalyst, the methanol is distilled off in vacuo and the residue is triturated with ether. For purification purposes it is dissolved in warm isopropanol and precipitated with ether.

Yield: 10.3 g. (88%). For analysis, the product is again reprecipitated from isopropanol/ether.

C$_{27}$H$_{48}$N$_4$O$_8$S (588.8)—Calcd. (percent): N, 9.51; S, 5.45. Found (percent): N, 9.6; S, 5.5.

(c) Z - Lys(Boc) - Pro-Val-Gly-Lys(Boc)-Lys(Boc)-Lys(Boc)-NH-(CH$_2$)$_4$-NH-Boc.—10.9 g. (10 mmols) of Z-Lys(Boc)-Pro-Val-Gly-Lys(Boc)-OH and 5.89 g. (10 mmols) of Boc-NH-(CH$_2$)$_4$-NH$_2$-tosylate in 100 ml. of dimethylformamide are combined with 12.8 ml. (10 mmols) of N-ethylmorpholine and 2.7 g. (20 mmols) of 1-hydroxybenzotriazole. 2.2 g. of dicyclohexyl-carbodiimide (11 mmols) are added at −10° C. The whole is then allowed to come to room temperature. The stirring is continued for 3 hours, the solvent is distilled off in vacuo. The residue is digested with 1 N bicarbonate and water and, after drying, recrystallized from acetonitrile. Yield: 10.6 g. (74.2%). M.P. 150–155° (while foaming). [α]$_D^{20}$: −24.0° (c.=1 in dimethylformamide).

C$_{73}$H$_{125}$N$_{13}$O$_{19}$·H$_2$O (1506.9)—Calcd. (percent): C, 58.20; H, 8.49; N, 12.07; H$_2$O, 1.20. Found (percent): C, 58.2; H, 8.4; N, 12.4; H$_2$O, 1.3.

(d) H-Lys(Boc)-Pro - Val - Gly-Lys(Boc)-Lys(Boc)-Lys(Boc) - NH - (CH$_2$)$_4$-NH-Boc-tosylate-dihydrate.—15.1 g. (10 mmols) of the Z-compound prepared according to (c) are catalytically hydrogenated in the presence of Pd in 300 ml. of methanol, a pH of 5 being maintained by simultaneously adding methanolic toluene-sulfonic acid. After complete reaction, the methanol is distilled off and the residue is reprecipitated from pyridine/ether and methanol/water. The oil which first precipitates becomes solid after a short time. Yield: 12.1 g. (77.5%).

C$_{72}$H$_{127}$N$_{13}$O$_{20}$S·2H$_2$O (1562.9)—Calcd. (percent): C, 55.15; H, 8.45; N, 11.64; S, 2.05. Found (percent): C, 55.4; H, 8.6; N, 11.6; S, 1.8.

(e) 1.65 g. (1.1 mmols) of Boc-β-Ala-Tyr-Ser-Met-Glu-(OBu$^t$)-His-Phe-Arg-Trp-Gly-OH.4H$_2$O and 1.56 g. (1 mmol) of H-Lys(Boc)-Pro-Val-Gly-Lys(Boc)-Lys-(Boc)-Lys(Boc)-NH-(CH$_2$)$_4$-NH-Boc-tosylate-dihydrate are dissolved together with 540 mg. (4 mmols) of 1-hydroxybenzotriazole in 30 ml. of dimethylformamide. A solution of 1.25 g. (6 mmols) of dicyclohexylcarbodiimide in 4 cc. of dimethylformamide is prepared and ⅓ of this solution is added to the above solution. The whole is stirred for 1 hour, then another third is added and, after a further hour, the last third is fed in. After a further 2 to 3 hours of stirring, the reaction product is precipitated with ether. Yield: 3:1 g.

Without further purification, the compound is freed from the protective groups by standing for 1 hour in 80–90% trifluoro-acetic acid containing some thioglycolic acid, and is subsequently precipitated by adding 150 ml. of ether. Yield: 3.06 g. of crude peptide-trifluoroacetate. After purification on carboxymethyl cellulose, 1.45 g. of the chromatographically pure peptide are obtained in the form of acetate. [α]$_D^{20}$: −68.6°±2° (c.=0.5 in 1% acetic acid).

Amino acid analysis:

Ser$_{0.86}$Glu$_{0.99}$Pro$_{0.97}$Gly$_{2.00}$Val$_{1.03}$Met$_{0.98}$
Tyr$_{0.92}$Phe$_{1.00}$βAla$_{1.01}$Lys$_{4.00}$His$_{1.02}$Arg$_{0.94}$

EXAMPLE 2

D-Ser-Tyr-Ser-Met-Glu-His-Phe-Arg-Trp-Gly-Lys-Pro-Val-Gly-Lys-Lys-Lys-NH-(CH$_2$)$_4$-NH$_2$-acetate, aq.

1.65 g. (1.1 mmols) of Boc-D-Ser-Tyr-Ser-Met-Glu-(OBu$^t$)-His-Phe-Arg-Trp-Gly-OH in analogy to Example 1(e) are reacted with 1.56 g. (1 mmol) of the heptapeptide amide prepared according to Example 1(d). After cleavage of the protective groups and after purification by chromatography on carboxymethyl cellulose, 1.28 g. of the chromatographically pure compound are obtained. [α]$_D^{20}$: −69°±2° (c.=0.5 in 1% acetic acid).

Amino acid analysis:

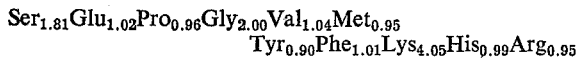

EXAMPLE 3

β - Hydroxypropionyl-Tyl-Ser-Met-Glu-His-Phe-Arg-Trp-Gly - Lys-Pro-Val-Gly-Lys-Lys-Lys-NH-(CH$_2$)$_4$-NH$_2$-acetate, aq.

(a) β-Hydroxypropionyl - Tyr - Ser-Met-Gly(OBu$^t$)-His-Phe-Arg-Trp-Gly-OH.—From 4.15 g. (40 mmols) of β-hydroxy-propionic acid hydrazide, the azide is prepared in analogy to Liebig's Ann. Chem. 726 (1969), page 177 et seq., and then reacted with 3.35 g. (25 mmols) of H-Tyr - Ser - Met-Glu(OBu$^t$)-His-Phe-Arg-Trp-Gly-OH.4 H$_2$O. Yield (after boiling with 90% methanol) 2.68 g. (71%).

C$_{68}$H$_{93}$N$_{15}$O$_{18}$S·4H$_2$O (1510.7)—Calcd. (percent): C, 54.02; H, 6.74; N, 13.90; S, 2.14. Found (percent): C, 53.8; H, 6.8; N, 14.1; S, 2.0.

(b) In analogy to Example 1(e), 1.54 g. (1.1 mmols) of the compound prepared according to (a) are reacted with 1.56 g. (1 mmol) of heptapeptide amide. After cleavage of the protective groups and purification by chromatography on carboxymethyl cellulose, 1.33 g. of the chromatographically pure compound are obtained. [α]$_D^{20}$: −69°±2° (c.=0.5 in 1% acetic acid).

Amino acid analysis:

Ser$_{0.85}$Glu$_{1.01}$Pro$_{0.95}$Gly$_{2.00}$Val$_{1.01}$Met$_{0.96}$
Tyr$_{0.91}$Phe$_{1.00}$Lys$_{4.02}$His$_{0.98}$Arg$_{0.97}$

EXAMPLE 4

N - ethyloxycarbonyl-Tyr-Ser-Met-Glu-His-Phe-Arg-Trp-Gly - Lys-Pro-Val-Gly-Lys-Lys-Lys-NH-(CH$_2$)$_4$-NH$_2$-acetate, aq.

(a) Etoc-Tyr-Ser-Met - Glu(OBu$^t$) - His - Phe - Arg-Trp-Gly-OH.2H$_2$O.—3.35 g. of H-Tyr-Ser-Met-Glu-(OBu$^t$)-His-Phe-Arg-Gly-OH·4H$_2$O (25 mmols) in 50 ml. of dimethylformamide are stirred for 20 hours at room temperature with 1.36 g. (40 mmols) of ethyloxycarbonyl-pentachlorophenyl ester. A nearly pure reaction product is precipitated by means of ethyl acetate, which product is recrystallized from 60% methanol with addition of 1 equivalent of N-ethylmorpholine. Yield: 2.86 g. (78%).

C$_{68}$H$_{93}$N$_{15}$O$_{18}$S·2H$_2$O (1474.7)—Calcd. (percent): C, 55.38; H, 6.63; N, 14.24. Found (percent): C, 55.2; H, 6.7; N, 14.3.

(b) In analogy to Example 1(e), 1.55 g. of the compound prepared according to (a) are reacted with 1.56 of heptapeptide amide. After cleavage of the protecting groups and purification by chromatography on carboxymethyl cellulose, 1.40 g. of the chromatographically pure compound are obtained [α]$_D^{20}$: −68.5°±2° (c.=0.5 in 1% acetic acid).

Amino acid analysis:

Ser$_{0.79}$Glu$_{1.02}$Pro$_{0.96}$Gly$_{2.00}$Val$_{1.04}$Met$_{0.95}$
Tyr$_{0.92}$Phe$_{0.99}$Lys$_{4.01}$His$_{1.01}$Arg$_{0.95}$

EXAMPLE 5

γAbu-Tyr-Ser-Met-Glu-His-Phe-Arg-Trp-Gly-Lys-Pro-Val-Gly-Lys-Lys-Lys-NH-(CH$_2$)$_4$-NH$_2$ (a) Boc-δAbu-Tyr-Ser-Met - Glu-(OBu$^t$)-His-Phe-Arg-Trp-Gly-OH.4H$_2$O.—5.36 g. (4 mmols) of H-Tyr-Ser-Met-Glu(OBu$^t$)-His-Phe - Arg-Trp-Gly - OH·4H$_2$O are stirred for 20 hours at room temperature with 3.06 g. (8 mmols) of Boc-γAbu-OTCP. A nearly pure Boc-decapeptide is precipitated with ethyl acetate/ether (1:1). Yield: 5.35 g. (87.8%). Purification by means of crystallization from 60% methanol.

C$_{69}$H$_{96}$N$_{16}$O$_{17}$S·4H$_2$O (1525.7)—Calcd. (percent): C, 54.21; H, 6.88; N, 14.67; S, 2.10. Found (percent): C, 54.3; H, 6.8; N, 14.5; S, 2.1.

(b) In analogy to Example 1(e), 1.68 of the compound prepared according to (a) are reacted with 1.56 of heptapeptide amide. After cleavage of the protective groups and after purification by means of chromatography on carboxymethyl cellulose, 1.29 g. of the chromatographically pure compound are obtained. [α]$_D^{20}$: −67.8°±2° (c.=0.5 in 1% acetic acid).

Amino acid analysis:

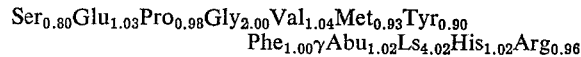

EXAMPLE 6

βAla-Tyr-Ser-Met-Glu-His-Phe-Arg-Trp-Gly-Lys-Pro-Val-Gly-Lys-Lys-Orn-NH-CH$_2$-CH$_2$-NH$_2$ (a) Z-Orn(Boc)-NH-CH$_2$-CH$_2$-NH-Boc.—In analogy to Example 1(a), 48.7 g. of Z-Orn(Boc)-ONP (0.1 mol) and 21.6 g. (0.11 mol) of NH$_2$-CH$_2$-CH$_2$-NH-Boc.HCl are reacted in the presence of 14.1 ml. of N-ethyl-morpholine in dimethylformamide. After the work-up, 30.84 g. (75.5%), having a melting point of 126°, are obtained.

C$_{25}$H$_{40}$N$_4$O$_7$ (508.6)—Calcd. (percent): C, 59.00; H, 7.93; N, 11.00. Found (percent): C, 58.7; H, 8.1; N, 10.8.

(b) H-Orn(Boc)-NH-CH$_2$-CH$_2$-NH-Boc-tosylate.—In analogy to Example 1(b), 15.3 g. of the Z-compound obtained sub(a) are hydrogenated while converting them into the tosylate. Yield: 12.2 g. (74.4%).

(c) Z-Lys(Boc)-Pro-Val-Gly-Lys(Boc)-Lys(Boc)-Orn (Boc)-NH-(CH$_2$)$_2$-NH-Boc.—In analogy to Example 1 (c), 5.47 g. (10 mmols) of the compound prepared according to (b) are reacted with 10.9 g. (10 mmols) of Z-hexapeptide. Yield: 10.3 g. (70.3%).

C$_{30}$H$_{50}$N$_0$O$_7$·H$_2$O (596.7) — Calcd. (percent): C, 57.36; H, 8.32; N, 9.56. Found (percent) C, 57.2; H, 8.4; N, 9.4.

(d) In analogy to Example 1(d), the Z-compound is hydrogenated. 8.6 g. (81.6%) of the corresponding tosylate are obtained. In analogy to Example 1(e), 1.5 g. of the tosylate (1 mmol) are reacted with 1.65 g. (1.1 mmols) of Boc-βAla-Tyr-Ser-Met-Glu(OBu$^t$)-His-Phe-Arg-Trp-Gly-OH·4H$_2$O and, after isolation, freed from protective groups. Purification in analogy to Example 1(f). Yield: 1.31 g. [α]$_D^{20}$: −69°±2° (c.=0.5 in 1% acetic acid).

Amino acid analysis:

Ser$_{0.82}$Glu$_{1.05}$Pro$_{0.98}$Gly$_{2.00}$Val$_{0.99}$Met$_{0.94}$Tyr$_{0.91}$
Phe$_{1.02}$βAla$_{1.01}$Lys+Orn$_{4.02}$His$_{0.98}$Arg$_{0.97}$

EXAMPLE 7

βAla-Tyr-Ser-Met-Glu-His-Phe-Arg-Trp-Gly-Lys-Pro-Val-Gly-Lys-Lys-Lys-NH-(CH$_2$)$_6$-NH$_2$-acetate, aq.

(a) Z-Lys(Boc)-NH-(CH$_2$)$_6$-NH-Boc.—In analogy to Example 1(a), 16.8 g. of Z-Lys(Boc)-OTCP and reacted with 7.7 g. of NH$_2$-(CH$_2$)$_6$-NH-Boc·HCl. Yield: 12.7 g. (70.8%), M.P. 78–80°.

C$_{30}$H$_{50}$N$_4$O$_7$·H$_2$O (596.7) — Calcd. (percent): C, 60.40; H, 8.78; N, 9.39. Found (percent): C, 60.6; H, 8.6; N, 9.3.

(b) After hydrogenation with simultaneous conversion into the tosylate in analogy to Example 1(b), 9.4 g. (72.3%) of H-Lys(Boc)-NH-(CH$_2$)$_6$-NH-Boc-tosylate are obtained.

(c) In analogy to Example 1(c), 6.2 g. (10 mmols) of the compound prepared according to (b) are reacted with 10.9 g. of Z-hexapeptide. Yield: 7.95 g. (70%).

C$_{75}$H$_{129}$N$_{13}$O$_{19}$·H$_2$O (1534.9)—Calcd. (percent): C, 58.65; H, 8.60; N, 11.86. Found (percent): C, 58.5; H, 8.4; N, 11.9.

(d) in analogy to Example 1(d), the compound prepared according to (c) is catalytically hydrogenated and converted into the tosylate. 1.6 g. of the tosylate, in analogy to Example 1(e), are reacted with 1.65 g. of Boc-βAla-Tyr-Ser - Met-Glu(OBu$^t$) - His-Phe-Arg-Trp- Gly-OH·4H$_2$O. Yield after cleavage of the protective groups and purification; 1.38 g. $[\alpha]_D^{20}$: —67.8°±2° (c.=0.5 in 1% acetic acid).

Amino acid analysis:

Ser$_{0.81}$Glu$_{1.02}$Pro$_{1.00}$Gly$_{2.00}$Val$_{1.02}$Met$_{0.92}$Tyr$_{0.90}$Phe$_{1.01}$βAla$_{1.02}$Lys$_{3.98}$His$_{0.97}$Arg$_{0.98}$

EXAMPLE 9

General instruction for the preparation of the bis-Boc-diamino-alkanes and the mono-Boc-diamino-alkane-hydrochlorides (a) 131 g. (1 mol) of Boc-NH-NH$_2$ in 600 ml. of dioxane are combined at 0° C. with 200 ml. of 5 N HCl. 70 g. of NaNO$_2$ in 180 ml. of water are added while stirring to this solution within 10-15 minutes at +5°. Stirring is continued for 15 minutes at room temperature. 0.5 mol of diamino-alkane in 150 ml. of dioxane, then 140 ml. of triethylamine, are further added to this solution and the whole is stirred for 24 hours at 50°. The product is then freed from solvent in vacuo. The remaining crystals are digested with water and recrystallized from isopropanol.

COMPOUND PREPARED
Boc—NH(CH$_2$)$_n$—NH—Boc

| | Melting point, degrees | Yield, percent |
|---|---|---|
| $n=2$ | 140–143 | 75.7 |
| $n=3$ | 108–112 | 69.8 |
| $n=4$ | 135–137 | 78.4 |
| $n=5$ | 91–93 | 70.3 |
| $n=6$ | 103–105 | 76.6 |

(b) 0.5 mol of each compound is suspended in 1.2 liters of 2 N HCl in ether, and stirred for 3 hours at room temperature, while excluding all humidity. (For the compounds $n=5$ and 6, 1 to 2 hours are sufficient.) The insoluble portion is the mono-Boc-diamino-alkane-hydrochloride wanted. The non-reacted starting product is recovered by evaporating the filtrate. Considering the recovered starting product, the yield is a nearly quantitative one.

Purification can be examined by thin-layer chromatography on prepared sheets of silica gel (Merck); eluant: n-butanol/glacial acetic acid/water (3:1:1).

R$_f$ bis-Boc-compound: 0.9
mono-Boc-compound: 0.4–0.6
diamine: 0.1

What is claimed is:
1. A peptide of the formula

X-Tyr-Ser-Met-Glu-His-Phe-Arg-Trp-Gly-Lys-Pro-Val-Gly-Lys-Lys-Y-NH-(CH$_2$)$_n$-NH$_2$ wherein X is β-alanyl, γ-aminobutyryl, D-seryl, β-hydroxypropionyl, or n-alkoxycarbonyl having 1 to 4 carbon atoms in the alkyl portion thereof, Y is lysine or ornithine, and $n$ is an integer from 2 to 6, all optically active amino acids being in their L-form except when X is D-seryl.

References Cited
UNITED STATES PATENTS

| 3,388,112 | 6/1968 | Geiger et al. | 260—112.5 |
| 3,632,743 | 1/1972 | Geller et al. | 424—45 |

FOREIGN PATENTS

| 1,512,342 | 10/1968 | France | 260—112.5 |
| 1,585,007 | 12/1969 | France | 260—112.5 |

OTHER REFERENCES

Geiger et al.: Ann. 726, 177–187 (1969).
Olelofsun et al.: J. Amer. Chem. Soc. 88, 4254–4260 (1966).
Jaque et al.: cited in Chem. Abst. 71, 98699 (1969).

LEWIS GOTTS, Primary Examiner

R. J. SUYAT, Assistant Examiner

U.S. Cl. X.R.

424—179